United States Patent [19]

Ishizuka

[11] 4,246,005

[45] Jan. 20, 1981

[54] DIAMOND AGGREGATE ABRASIVE MATERIALS FOR RESIN-BONDED APPLICATIONS

[76] Inventor: Hiroshi Ishizuka, No. 19-2, Ebara 6-chome, Shinagawa-ku, Tokyo, Japan

[21] Appl. No.: 18,521

[22] Filed: Mar. 8, 1979

[30] Foreign Application Priority Data

Apr. 1, 1978 [JP] Japan .................................. 53-37456
May 15, 1978 [JP] Japan .................................. 53-56653

[51] Int. Cl.³ ........................... C09K 3/14; B24D 3/06
[52] U.S. Cl. ...................................... 51/298; 51/295; 51/309
[58] Field of Search ......................... 51/309, 295, 298

[56] References Cited

U.S. PATENT DOCUMENTS

| | | | |
|---|---|---|---|
| 3,912,500 | 10/1975 | Vereschagin | 51/309 |
| 3,913,280 | 10/1975 | Hall | 51/309 |
| 3,923,476 | 12/1975 | Roy | 51/295 |
| 3,955,324 | 5/1976 | Lindstrom | 51/309 |
| 4,062,660 | 12/1977 | Nicholas | 51/295 |
| 4,063,909 | 12/1977 | Mitchell | 51/309 |
| 4,151,686 | 5/1979 | Lee et al. | 51/295 |
| 4,181,505 | 1/1980 | De Vries et al. | 51/309 |

*Primary Examiner*—Donald J. Arnold
*Attorney, Agent, or Firm*—Henry R. Lerner

[57] ABSTRACT

A process for producing diamond aggregate abrasive material for resin bonded applications, which process comprises:
  combining a plurality of seed diamond microcrystallites with a non-diamond carbon nutriment;
  subjecting the combination, in the presence of at least one metal functionable as catalyst for conversion from non-diamond carbon to diamond, to a pressure-temperature condition within the diamond thermodynamical stability region of carbon phase diagram;
  maintaining the condition to grow the seed microcrystallites and unite thus grown-up seed crystallites together; and
  recovering aggregates thus produced.

7 Claims, No Drawings

DIAMOND AGGREGATE ABRASIVE MATERIALS FOR RESIN-BONDED APPLICATIONS

The present invention relates to a process for producing a diamond abrasive material, particularly to a diamond aggregate abrasive material capable of an improved grinding performance especially when resin bonded.

For diamond abrasive grains to be usable as contained in resin bonded grinding wheels, the grains are required to exhibit a high friability and a good self-sharpening property, that is, a cap ability to provide at the working front fresh cutting edges during grinding operation by grain cracking followed by removal of wornout portions as chips from the resin bond matrix.

When resin bonded diamond wheels are used for grinding operation where an increased volume is to be removed, such work is usually done with wheels containing coarser diamond grains at a rather high infeed rate. In such runds the abrasive grains are subjected to very severe force conditions: a pulling force works on the grains continually and intensively. In case such force would exceed eventually a retention strength of the grains to the bond matrix, it causes premature dropout of abrasive grains, resulting in a decreased effective life of the wheels disadvantageously. For obtaining a reasonable result both in the effective life and working efficiency of wheels, a size of 60 mesh/in. has been generally considered to be practically an upper limit for the size of diamond grains applicable to resin bonded wheels.

While, very fine diamond grains are essentially employed in such tools in case where a high precision finishing is necessary on the ground surface of the work. With any conventional techniques a higher grinding efficiency and a higher precision surface finishing have been impossible to be obtained at the same time. Thus when a work is to be ground to a very high precision, it is necessarily subjected to successive runs from rough- to precision grinding with a series of wheels using diamond grains stepwise decreasing in particle size, with the best efforts made to produce the desired final precision in a period as short as possible.

Conventional wheels directed to precision finishing contain diamond grains in general of several micron particle size. Disadvantageously such smallness of the abrasive grains requires, in preparation of the wheel, a rather troublesome highly specialized technique for well distributing the grains in the resin matrix. Further the wheels thus obtained only exhibit rather a short period of effective life, and inapplicable to a heavy duty grinding at an increased downfeed rate for a higher efficiency, principally because the grains only have an insufficient bonding strength to the matrix for such purposes, and are susceptible to premature dropout under such severe force conditions.

Several possibilities have been proposed in publications for improving the grain-matrix retention. Prevailing nickel coating on the grains is known from, for example, U.S. Pat. No. 3,904,391 to Lindstrom et al. This technique has achieved the purpose by increasing the contact surface area of individual grains. Being enveloped by a continuous metallic coat, a substantial part of the grain is allowed to stay in the matrix for a long duration after the grain has been cracked into portions. Such metallic coat, however, sets unfavorably an upper limit for effectively applicable coat thickness, because a too great thickness results in a decreased grinding efficiency.

For improving the grain friability as well as the retention strength in the matrix, the diamond grains themselves can be synthesized as having a skeletonized structure; can be microcracked at the surface by a thermal shock, that is, by rapidly cooling the grains after their heating as according to Japanese patent publication No. 29716/73 (Pat. No 726,258); or surface-etched with an oxidizer to an irregular surface configuration according to Japanese patent publication No. 11875/75 (Pat. No. 800,955), each patent having been granted to the same Applicant as the instant case.

Though the products thus treated may exhibit to some degree an improvement in the retention strength and cutting capability for grinding wheels, there are some drawbacks observed: skeleton-structured grains tend to exhibit a too high friability, and thermally shocked grains tend to be pulled out of the resin matrix rather as a blocky fraction than as microchips. They both mean a high diamond consumption. The oxidizer treatment provides microcracks, and thus an improved friability property just at the surface, never into the depth of the grain. Further general disadvantages have been observed for the prior art that there is never provided a sufficient retention strength for achieving any heavy duty grinding operations, principally due to insufficient surface irregularity of each grain, even with a metallic coat added thereon.

It is also understood that the grain retention can be significantly improved by using such grains as aggregates of particles. Conventionally some processes are known for production of diamond aggregate abrasives in which:

1. starting material diamond particles are binded together with a metal capable of dissolving carbon, and such aggregate product is crushed into grits of desired particle sizes;

2. diamond grains are scattered and fixed in a metallic matrix as disclosed in U.S. Pat. Nos. 2,216,728 and 3,955,324 to Benner and Lindstrom, respectively; and 3. starting material non-diamond carbon is converted to diamond particles in the presence of catalyst-solvent metals, as disclosed in, for example, U.S. Pat. No. 4,089,933 to Vereschagin et al.

There are drawbacks involved in each of the grits from the above processes:

that the grit of first product only exhibits a poor fracturing property: the fracture will occur under a smaller grinding force into rather blocky portions than finer chips, in spite of the structure composed of fine crystallines; a greater force will pull out the grit in entirety before it breaks;

that resin bonded grinding wheels containing the second product tend to release diamond particles readily, because of a rather loose retention in the metallic matrix, causing a high diamond consumption; and that the aggretate of the third product unfavorably contains diamond particles of wide ranging sizes.

Such conventional aggretate abrasives, therefore, never permit to cover just by themselves grinding operations under various conditions.

Further a process is known from U.S. Pat. No. 4,042,673 to Strong for growing seed diamond crystallites under a pressure-temperature condition where diamond is the thermodynamically stable phase of carbon. The process, however, is intended to grow a single diamond crystal, and far from application to producing diamond aggregates.

Thus the present invention has been developed to obviate the above limited disadvantages necessarily involved in the prior art.

An object of the invention is to provide a novel process for producing an abrasive material adequate to application to heavy duty grinding operations as used in a resin bond matrix.

Another object of the invention is to provide a process for producing an abrasive material of novel type which permits wheels containing it of covering, by itself, operations under various grinding conditions, for example, from rough- to precision grinding.

According to the invention there is provided a process for producing such abrasive materials which process comprises combining a plurality of seed diamond microcrystallites with a non-diamond carbon nutriment, subjecting the combination, in the presence of at least one metal functionable as catalyst for conversion from non-diamond carbon to diamond, to a pressure-temperature condition where diamond is the thermodynamically stable phase of carbon, that is, within the diamond stability region of carbon phase diagram, maintaining the condition for a period of time sufficient for growing and subsequently interjointing the crystallites, and recovering aggregates thus produced.

The above referred "diamond stability region of carbon phase diagram" is to be understood as determined by R. Berman and Sir F. Simon in Zeitschrift für Elektrochemie, Vol. 59, No. 5 (1955) pp. 333–338, and by C. Scott Kennedy and George C. Kennedy in Journal of Geophysical Research, Vol. 81, No. 14 (1976) pp. 2467–69, but above the eutectic temperature under the applied pressure of carbon the metal "functionable as catalyst for conversion from non-diamond carbon to diamond", which metal can be selected from the ones disclosed in, for example, U.S. Pat. Nos. 2,947,609, 2,947,610 and 3,334,968. Such metals include many of Group VIII metals in the periodical table and their alloys, specifically nickel, cobalt, iron and their alloys.

In the aggregate product of the invention, particle size of component diamond crystallites substantially depends upon the dimensions of the seed as well as its ratio to the graphite to which it is added.

Diamond particles of 5–30 microns are advantageously employed as seed crystallites for the invention: finer crystals will not grow efficiently in a reasonable reaction time, while, coarser ones only grow to a product which is inadequate to heavy duty grinding applications, because component diamond particles tend to be pulled out of the resin matrix in their entirety before they break down into chips during abrasive works due to an insufficient retention strength to the matrix through the small contact surface area between the particle and the matrix.

It is preferable that the seed crystallites be contained in the starting powder mixture no less than 1 weight % relative to the non-diamond carbon nutriment with which the former are to be combined.

It is also preferable that the seed crystallites be so selected as to exhibit in general a substantially even particle size for obtaining component crystallites of aggregate within a close range of particle size.

It is essential to the invention that the seed crystallites be grown to a radial dimension not in excess of five times, preferably three times, as much as the initial particle size of the seed crystallites.

When the seeds are added to graphite nutriment, it is preferable that individual crystallites be separately positioned with a spacing between each pair of them in a fine granular graphite powder, and that the catalyst metal be used as a plate or in another blocky form when charged in a reaction vessel for a high pressure-temperature treatment.

The reaction mechanism for the growth and subsequent interjointing of grown-up diamond crystallites can be estimated as below:

Under pressure-temperature conditions for diamond thermodynamical stability when the catalyst metal melts, carbon atoms dissolved in the metal will deposit on seed diamond particles to initiate the growth, so that each pair of seed particles in a relative close neighborhood get jointed together directly or indirectly through a metallic phase intervening between them in a rather distant neighborhood, through the process of carbon atom re-arrangement, dissolution and deposition which partially occur on the surface of such seed particles as usually observed in the case of sintering process under liquid phase presence.

Thus each of small component diamond particles is incorporated in the aggregate of the invention principally through a diamond-diamond bonding with little amount of metallic phase intervening them. Such adhesion is by far stronger than that between the grit and resin matrix, the latter alone exists in conventional type grinding wheels. Each of the aggregates according to the invention, therefore, behaves substantially as a single block in the resin matrix of grinding wheels at work, yielding a significantly increased retention strength in the matrix in comparison with conventional diamond abrasives. The excellent retention strength of the invention is due to the very complicated surface configuration resulting in a significantly increased contact surface area as compared with conventional cases where individual diamond crystals of such size are separately contained in the resin.

The component crystallites of aggregates according to the invention retain a good friability characteristic adequate to resin bonded applications, thus a high cutting capability is obtainable to give an extended effective life.

The above said characteristics of the invention support that employment of such aggregate as grits permits the wheels containing them of a heavy duty grinding for a higher efficiency, as well.

Each of component diamond particles of aggregates can be used up to the last chip effectively, for they have been, as stated before, very firmly incorporated, actually through the diamond-diamond bonding, in the aggregate. The aggregates, thus, permit an improved diamond saving as well as an extended wheel life.

The aggregate grits of the invention will not leave any scratches on the work surface coarser than that each component would make: under an excessive force the grits simply fracture some joint of component particles because of a lower strength than that of particle proper just by releasing component particles one by one, never as a group of a plurality of such particles to form greater edges.

The particle size of component crystallites by itself is decisive to the surface roughness obtainable on the work. According to the invention crystallites of arbitrary fineness can be used as component for forming aggregate grits of any desired particle size. This clearly results that a wheel can be made which permits performance of a very high precision grinding at a significantly increased downfeed rate for a higher efficiency.

The aggregate grits of the invention are preferably coated with nickel or other metals, for an improved retention strength, chemically or in other electroless manners conventionally known, a few of which processes are disclosed in U.S. Pat. No. 3,904,391 and Japanese patent publication Nos. 27874/77, 27875/77 and 29716/73 to the Applicant.

The invention now will be described in more detail with reference to examples.

EXAMPLE 1

A reaction vessel made of an agalmatolite cylinder, which has an inner diameter of 30 mm and a height of 40 mm, is charged with alternating ten layers of 0.5 mm thick cobalt disc and a mixture of graphite powder with seed diamond microcrystallites. Each layer of mixed powder is composed of 3 grams of graphite powder of 40/100 mesh/in. granularity and 0.3 grams of 5–12 micron diamond powder. The whole charge as contained in the vessel is placed in a device as disclosed in U.S. Pat. No. 4,097,208 or 3,546,413 and is subjected to a pressure of approximately 55 Kb at a temperature of about 1400° C. The combined condition is maintained for 20 minutes. The product from the reaction vessel is rough crushed, cobalt-removed with hydrochloric acid, and graphite-removed by means of heavy liquid separation.

The aggregates are obtained substantially in the form of a one millimeter thick plate in which component diamond crystallites of approximately 15 microns on an average have been incorporated. The aggregates are ball-milled into grits by breaking down at relatively weak portions as mentioned above, washed in hydrochloric acid, and sieved into fractions of various particle size.

Thus obtained 120/140 mesh/in. particles are further divided into two, one of which is contained in wheels without any further treatment; the other is contained in wheels after they have been deposited with a nickel coat in an electroless manner on each of them to a metal amount equal to 55 weight % relative to the combination of the metal and substrate grit.

The wheels manufactured are specified as below:

| | |
|---|---|
| Shape and dimensions: | Type 1 A 1<br>150 mm (dia.) × 5.3 mm (width) ×<br>2.5 mm (depth of grit impregnation)<br>× 50.8 mm (central bore dia.) |
| Bonding materials: | Phenolic resins |
| Grit concentration: | 100 (= 4.4 Carat/cm$^3$): for uncoated grits.<br>75 (= 3.3 Carat/cm$^3$) for coated grits. |

Grinding performance has been examined of the above wheels and, for comparison purposes, ones which are manufactured as specified above but containing conventionally produced separate particle grits of a size corresponding to general size of the grits, 120/140 mesh/in., without- and with a nickel coat on each of them. Grinding conditions follow:

| | |
|---|---|
| Wheel speed: | 1500 m/min. |
| Downfeed: | 0.025 mm; 0.050 mm |
| Table traverse speed: | 15 m/min. |
| Crossfeed: | 1.5 mm/pass |

| | |
|---|---|
| Work material: | Cemented tungsten carbide alloy (WC-Co) Mitsubishi Metals' (Japan) HTi 10 (equivalent to Japanese Industrial Standards grade K-10) 36 pieces having a total area of 57.6 cm$^2$ |
| Coolant: | Cold water added with 500 ppm sodium hypophosphate, or Yushiroken CCC (trade name given to Yushiro Chemical Industries' (Japan) product mainly composed of anti-corrosive and surface activating agents). Its dilution to a factor of 70. |
| Wheels mounted on: | Okamoto Kosaku Kikai's (Japan) surface grinder Model PSG-5EV. 2.2 KW |

Grinding performance for the grits of the invention is given in the table below. The values are indicated in the grinding ratio (G-Ratio) together with its percentage to that obtained with conventional diamond grits. The grinding ratio is such of the removed volume of work during the grinding to the wornout volume of the wheel employed.

| Sort | Downfeed | G-Ratio | Relative Performance |
|---|---|---|---|
| Uncoated Grits | 0.025 mm | 93 | 130% |
| | 0.050 mm | 16 | 120% |
| Coated Grits | 0.025 mm | 555 | 150% |
| | 0.050 mm | 81 | 125% |

EXAMPLE 2

The vessel and conditions for the reaction are same as that in Example 1 but that a mixture of 0.2 grams of 12–25 micron diamond crystallites and 3 grams of 40/100 mesh/in. graphite powder is charged after the mixture has been compressed to a tablet (circular pellet).

The produced aggregates exhibit a structure in which component diamonds averaging about 30 microns have been firmly interjointed with each other. The aggregates are ball-milled, and sieved to recover 120/140 mesh/in. grits, which are then embedded in a resin bond matrix for manufacturing wheels as in Example 1 without- and with a nickel coat on each of them, respectively. The wheels are examined for grinding performance.

Grinding performance evaluated as in Example 1 follows:

| Sort | Downfeed | G-Ratio | Relative Performance |
|---|---|---|---|
| Uncoated Grits | 0.025 mm | 93 | 130% |
| | 0.050 mm | 19 | 150% |
| Coated Grits | 0.025 mm | 462 | 125% |
| | 0.050 mm | 117 | 180% |

EXAMPLE 3

A reaction vessel of the same dimensions and material as in Example 1 is charged with alternating ten layers of 0.5 mm thick michrom disc and a mixture of graphite powder and seed diamond microcrystallites. Each layer of mixture is composed of 3 grams of −300 mesh/in.

graphite powder and 0.6 grams of 2–4 micron diamond powder, which mixture is formed into pellet. The materials as a whole are subjected to an approximately 55 Kb pressure at about 1400° C. The condition is maintained for 20 minutes.

The reaction product is rough crushed, metal-removed in hydrochloric acid, and graphite-removed by heavy liquid separation to recover the aggregates. The latter are ball-milled to break down at weaker portions as mentioned above, and sieved to recover 100/140 mesh/in. particles, with residues on the 100 mesh/in. screen reball milled and sieved. The aggregate grits are further washed with hydrochloric acid, chemically nickel-coated to the metal deposition of a weight of 1.2 times as much as the substrate diamond aggregate grit, and used for manufacturing wheels.

The specification of wheels follows:

| Shape and dimensions: | Type 1 A 1<br>150 mm(dia.) × 5.3 mm (width) ×<br>2.5 mm (depth of grit impregnation) × 50.8 mm (central bore dia.) |
|---|---|
| Bonding materials: | Phenolic resins |
| Grit concentration: | 75 (= 3.3 Carat/cm$^3$) |

The wheels are submitted to performance examination under the following conditions for grinding cemented tungsten carbide alloy.
Wheel speed: 1500 m/min.
Downfeed: 0.01 mm
Table traverse speed: 5 m/min.
Crossfeed: 1.5 mm/pass
The work material, coolant and testing machine on which the wheels are mounted are each identical to those as used in Example 1.
The results obtained are:
Grinding ratio: 300
Surface roughness: 0.3 microns
The conventional product giving an identical surface roughness only achieves a grinding ratio of as low as 30, with a particle size of as fine as 5–12 microns.

EXAMPLE 4

The vessel arrangement and conditions used for reaction are identical to that of Example 1. Each layer of mixed powder consists of 3 grams of −300 mesh/in. graphite powder and 1.0 gram of 30–40 micron diamond crystallites. The produced aggregates exhibit a structure in which component diamond crystallites, with an average particle size of 50–60 microns, have been interjointed. The aggregates are crushed with a ball mill into grits of 30/50 mesh/in. particle size, and are contained in wheels as specified in Example 3 but at a grit concentration of 100. The wheels are examined for grinding performance of a WC-Co alloy under the conditions:
wheel speed: 1500 m/min.
Downfeed: 0.025 mm
Table traverse speed: 15 m/min.
Crossfeed: 1.5 mm/pass
The work material, coolant and testing machine on which the wheels are mounted are each identical to those as used in Example 1.

The grinding ratio calculates to 230. In comparison, the conventional product directed to the corresponding application of 60/80 mesh/in. particle size, practically the upper limit for conventionally available products, just gives a grinding ratio of no more than 150.

EXAMPLE 5

The vessel arrangement and conditions for the reaction are identical to that used in Example 3. Each of the powder layers consists of 3 grams of −300 mesh/in. graphite powder and 0.06 grams of 4–6 micron diamond powder. The aggregate exhibits a structure in which component crystallites of approximately 20 microns particle size on an average have been interjointed. They are crushed into 120/140 mesh/in. grits which are further nickel-coated in an electroless manner to a metal deposit weighing 1.2 times as much as the substrate grit, and contained in wheels as specified in Example 3 at a grit concentration of 75.

The wheels are examined for grinding performance of a WC-Co alloy under the following conditions:
Wheel speed: 1500 m/min.
Downfeed: 0.025 mm; 0.050 mm
Table traverse speed: 15 m/min.
Crossfeed: 1.5 mm/pass
The work material, coolant and testing machine on which the wheels are mounted are each identical to those as used in Example 1.

Grinding ratios are calculated to be 450 at a 0.025 mm downfeed and 85 at 0.05 mm. Corresponding results are obtained as 370 and 65, respectively, for conventional 120/140 mesh/in. separate particles of the same direction as the instant case, with a nickel coat on each of them.

The diamond aggregate abrasive grits according to the invention exhibit and following characteristics and favorable effects involved in them:

1. Each of the aggregate grits have a structure in which there have been interjointed firmly component diamond microcrystallites with an average of as small as ten or tens of microns by diameter, thus providing a significantly increased surface area together with a very complicated surface configuration. When the grits are contained in a resin bond matrix of a grinding wheel, such surface characteristic gives a by far improved mechanical retention strength to the matrix, and thus an increased effective life because of substantially eliminated premature pullout of each component diamond particles.

2. Each component diamond particle retains an essential property to resin bonded application, that is, it is very susceptible to microcracking during abrasive works, thus providing at the front ever sharp cutting edges. In addition to the good retention to the resin matrix, a very great bonding strength between the component particles themselves allows such characteristic, or a high cutting capability, to be effectively exhibited to the very last chip of particle, and, in case of any excessive force working on the grit, permits the fraction to occur in a harmless way, actually as a removal of component particles under the force one after another, thus substantially preventing any greater edges from being formed and resulting coarser scratches left on the work surface.

3. Aggregates are readily obtainable for wide varying applications from a high efficient to very high precision grinding, just by selecting the particle size of seed microcrystallites employed and the seed ratio to graphite to which the former is added.

4. Aggregates of the invention can be used in a size in excess of 60 mesh/in. practically the upper limit for conventional products directed to resin bonded applications. In this case there is provided an excellent grit retention to the resin matrix, permitting an operation at an increased downfeed rate, that is, a very heavy duty grinding operation, thus a significantly improved time saving being attainable.

5. Grinding works in various stages, from rough to precision grinding, can be covered just with a single wheel by changing the downfeed ratio applied when the aggregates in the wheel are composed of rather fine diamond crystallites.

6. The aggregate grits of the invention permit simplified sieving or other sorting processes in comparison with that required for conventional products, for the grits of the invention can be selected in a very wide range of sizes and shapes, because such grits anyways produce a rather high precision on the work surface whatever general size the aggregate grits may exhibit.

7. In comparison with the conventional methods in which aggregate or separate diamond particles are produced through a conversion from graphite beginning with spontaneous nucleation, much milder pressure conditions are available for practising a process according to the invention, because the pressure is only required just for the growth of pre-formed seed diamond microcrystallites.

What I claim is:

1. A process for producing diamond aggregate abrasive grits for resin bonded applications, which process comprises:
    combining with a non-diamond carbon nutriment a plurality of seed diamond microcrystallites of a particle size ranging from 5 to 30 minutes;
    subjecting such combination, in the presence of at least one metal functionable as catalyst for conversion from non-diamond carbon to diamond, to a pressure-temperature condition within the diamond thermodynamical stability region of carbon phase diagram;
    causing growth of such diamond microcrystallites under such condition until the diamonds exhibit a radial dimension not in excess of five times the starting particle size thereof, thus interjointing seed crystallites together;
    recovering aggregates thus formed; and
    crushing the aggregates into grits of desired particle size.

2. A process as recited in claim 1, wherein the crystal growth in such dimension is not in excess of three times the starting particle size of the seed crystallites.

3. A process as recited in either of claims 1 or 2, wherein the seed microcrystallites in general exhibit a substantially even particle size.

4. A process as recited in claim 1, wherein the grits are chemically metal coated.

5. A process as recited in claim 4, wherein the grits are chemically nickel coated.

6. A process as recited in claim 1, wherein the metal functionable as catalyst is selected from the pure metals and alloys thereof in Group VIII of the periodic table.

7. A process for producing diamond aggregate abrasive grits for resin bonded applications, which process comprises:
    combining with a non-diamond carbon nutriment a plurality of seed microcrystallites of a particle size ranging from 5 to 30 microns, said combination containing diamonds no less than 1 weight % relative to the non-diamond carbon nutriment;
    subjecting such combination, in the presence of at least one metal functionable as catalyst for conversion from non-diamond carbon to diamond, to a temperature-pressure condition within the diamond thermodynamical stability region of carbon phase diagram;
    causing growth of such diamond microcrystallites under such condition until the diamonds exhibit a radial dimension not in excess of five times the starting particle size thereof, thus interjointing seed crystallites together;
    recovering aggregates thus formed; and
    crushing the aggregates into grits of desired particle size.

* * * * *